(12) United States Patent
Vinet et al.

(10) Patent No.: US 10,399,759 B2
(45) Date of Patent: Sep. 3, 2019

(54) MANUALLY OPENABLE RECYCLABLE PACKAGE

(71) Applicant: Bemis Company, Inc., Neenah, WI (US)

(72) Inventors: Séverine K. Vinet, Thuin (BE); Luc Vandendriessche, Otegem (BE)

(73) Assignee: Bemis Company, Inc., Neenah, WI (US)

( * ) Notice: Subject to any disclaimer, the term of this patent is extended or adjusted under 35 U.S.C. 154(b) by 187 days.

(21) Appl. No.: 15/553,464

(22) PCT Filed: Mar. 9, 2015

(86) PCT No.: PCT/US2015/019355
§ 371 (c)(1),
(2) Date: Aug. 24, 2017

(87) PCT Pub. No.: WO2016/144308
PCT Pub. Date: Sep. 15, 2016

(65) Prior Publication Data
US 2018/0037388 A1 Feb. 8, 2018

(51) Int. Cl.
*B65D 77/20* (2006.01)
*B32B 27/36* (2006.01)
(Continued)

(52) U.S. Cl.
CPC ............ *B65D 77/2032* (2013.01); *B32B 1/02* (2013.01); *B32B 7/12* (2013.01); *B32B 27/08* (2013.01);
(Continued)

(58) Field of Classification Search
CPC .............. B65D 17/4011; B65D 17/404; B65D 55/026; B65D 77/2048; B65D 77/2056;
(Continued)

(56) References Cited

U.S. PATENT DOCUMENTS 3,686,069 A * 8/1972 Winkler et al. ......... B32B 27/00
428/475.2
4,375,494 A * 3/1983 Stokes .................... B32B 27/08
428/323

(Continued)

FOREIGN PATENT DOCUMENTS

EP 2878440 A1 * 6/2015 ............. B32B 25/14
WO 9958328 A2 11/1999

OTHER PUBLICATIONS

Translation of EP2878440, Wink et al., Jun. 3, 2015, Fig. 3 (Year: 2015).*

*Primary Examiner* — Robert J Hicks

(57) ABSTRACT

The present invention is directed to a thermoplastic package includes a tray and a lidding film both of which are suitable for recycling into a polyethylene terephthalate (PET) recycling stream. Packages according to the present invention comprise predominantly amorphous polyethylene terephthalate (APET) relative to the total weight of the package. Another object of the present invention is to provide a package especially for retail display for containing a food such as fresh produce, cheeses and meats, and/or non-food product. Still another object of the present invention is to provide a manually openable package which includes a tray peelable heat sealed to a lidding film laminate.

20 Claims, 7 Drawing Sheets

(51) Int. Cl.
| | |
|---|---|
| B32B 7/12 | (2006.01) |
| B32B 27/08 | (2006.01) |
| B32B 1/02 | (2006.01) |
| B32B 37/12 | (2006.01) |
| B65B 55/02 | (2006.01) |
| B65D 65/40 | (2006.01) |
| B32B 38/00 | (2006.01) |
| B65D 55/02 | (2006.01) |

(52) U.S. Cl.
CPC .............. *B32B 27/36* (2013.01); *B32B 37/12* (2013.01); *B32B 38/145* (2013.01); *B65D 55/026* (2013.01); *B65D 65/40* (2013.01); *B65D 77/204* (2013.01); *B32B 2255/10* (2013.01); *B32B 2255/26* (2013.01); *B32B 2307/31* (2013.01); *B32B 2307/4023* (2013.01); *B32B 2307/514* (2013.01); *B32B 2307/518* (2013.01); *B32B 2307/702* (2013.01); *B32B 2307/7242* (2013.01); *B32B 2307/7244* (2013.01); *B32B 2307/732* (2013.01); *B32B 2307/738* (2013.01); *B32B 2307/748* (2013.01); *B32B 2435/02* (2013.01); *B32B 2439/40* (2013.01); *B32B 2439/62* (2013.01); *B32B 2439/70* (2013.01); *B32B 2553/00* (2013.01)

(58) Field of Classification Search
CPC ............ B65D 77/2044; B65D 77/2036; B65D 77/2032; B65D 77/2028; B65D 77/204; B32B 1/02; B32B 7/12; B32B 27/08; B32B 27/36; B32B 27/40; B32B 27/38; B32B 27/30

USPC ... 220/359.3, 359.4, 359.2, 359.1, 212, 265, 220/266, 270; 215/232

See application file for complete search history.

(56) References Cited

U.S. PATENT DOCUMENTS

| | | | | |
|---|---|---|---|---|
| 4,765,999 | A | | 8/1988 | Winter |
| 4,980,210 | A | * | 12/1990 | Heyes .................. B21D 51/383 428/35.9 |
| 5,039,001 | A | | 8/1991 | Kinigakis et al. |
| 5,079,052 | A | * | 1/1992 | Heyes ..................... B32B 15/08 428/35.3 |
| 5,358,184 | A | | 10/1994 | Skudrzyk |
| 5,508,075 | A | * | 4/1996 | Roulin ................... B32B 27/08 428/35.7 |
| 5,882,789 | A | | 3/1999 | Jones et al. |
| 6,066,594 | A | * | 5/2000 | Gunn ..................... B32B 27/08 503/227 |
| 6,610,378 | B1 | | 8/2003 | Kimura et al. |
| 7,186,452 | B2 | | 3/2007 | Felffer et al. |
| 7,205,040 | B2 | | 4/2007 | Feiffer et al. |
| 7,569,276 | B2 | | 8/2009 | Kendig et al. |
| 8,133,592 | B2 | | 3/2012 | Takada et al. |
| 2004/0023045 | A1 | * | 2/2004 | Andersson ................ B32B 7/12 428/461 |
| 2004/0132600 | A1 | * | 7/2004 | Magnusson ............ B32B 27/08 493/51 |
| 2009/0130276 | A1 | | 5/2009 | Voisin et al. |
| 2013/0224946 | A1 | | 8/2013 | Fayne et al. |
| 2015/0101741 | A1 | * | 4/2015 | Glaser .................... B32B 27/08 156/244.11 |
| 2015/0284162 | A1 | * | 10/2015 | Bellamah ............... B32B 15/08 206/245 |

* cited by examiner

MANUALLY OPENABLE RECYCLABLE PACKAGE

BACKGROUND OF THE INVENTION

The present invention relates generally to primary packaging and more particularly, to manually openable packages for containing a product. Specifically, the present invention refers to manually openable packages formed from recyclable materials.

Discarded packaging materials often wind up in a landfill. In some countries, particularly the U.S., there is a significant decrease in the availability of landfill space when approximately 90% of the municipal solid waste is disposed of by landfilling. Recyclable packaging materials can dramatically reduce landfill waste. Today, there are a number of plastics considered recyclable which may enter established recycling streams. These materials include low density and linear low density polyethylene, high density polyethylene, polypropylene, polyethylene terephthalate, polystyrene and a few others. Polyethylene terephthalate (PET) bottles and jars are generally considered recyclable. The PET can be recovered and recycled again and again thorough washing and re-melting for use in new bottles or jars, or by chemically breaking down the PET into its constituent raw materials, which are then purified and converted into new PET resins. In the last few years there has been a significant increase in the use of PET trays by the packaging industry. Unfortunately, most of these trays and other PET containing packaging cannot be easily recycled because they are made up of a plurality of layers of a variety of plastic materials. Recycling of such packages can involve costly cleaning and sorting operations to separate the recyclable plastics from any non-recyclable materials. The fewer the non-recyclable materials there are and the more chemically similar the recyclable plastics present in a package, the less expensive and more efficient the recycling operations become.

SUMMARY OF THE INVENTION

An important object of the present invention is that the thermoplastic package includes a tray and a lidding film both of which are suitable for recycling into a polyethylene terephthalate (PET) recycling stream. Towards this end, packages according to the present invention comprise predominantly amorphous polyethylene terephthalate (APET) relative to the total weight of the package. In one preferred embodiment, the package of the present invention advantageously comprises at least 97% by weight of recyclable polyethylene terephthalate relative to the total weight of the package.

Another object of the present invention is to provide a package especially for retail display for containing a food such as fresh produce, cheeses and meats, and/or non-food product. In one preferred embodiment, the package of the present invention is advantageously well-suited for packaging of respiring foodstuffs, particularly carbon dioxide respiring foodstuffs, especially cheese such as for example emmental, gouda and edam. Towards this specific end, the packages of the present invention have an average oxygen transmission rate of 12 $cm^3/m^2$ for 24 hours at 23° and 50% relative humidity and an average carbon dioxide transmission rate of 54 $cm^3/m^2$ for 24 hours at 23° and 50% relative humidity.

Still another object of the present invention is to provide a manually openable package which includes a tray peelable heat sealed to a lidding film laminate. A manually openable package is one in which the peel strength of the lidding film laminate to the tray can be controlled over a wide temperature range. It is important that the seal between the tray and lidding film have sufficient seal strength to remain secure and unbroken during package fabrication, distribution and storage. In one preferred embodiment, the heat seal between the tray and lidding film is hermetic and can readily peel apart by hand without uncontrolled or random tearing or rupturing of the tray and/or lidding film. A manually peelable heat seal is one having a peel strength of between 1 N/15 and 6 N/15 mm at 23° C.

The basic embodiment of the present invention is a package for containing a product having a thermoplastic tray with a product receiving area and a sealing flange. The tray is formed from an amorphous polyethylene terephthalate. The invention includes a multilayer thermoplastic lidding film laminate having seal area which is peelable sealed to the tray. The laminate includes a first outer layer comprising a polyester copolymer heat sealing lacquer positioned within the seal area, a second outer layer comprising an amorphous polyethylene terephthalate, and a third layer positioned between the first and second outer layers which comprises an oriented polyethylene terephthalate. The present invention further includes a hermetic seal having a perimeter heat seal circumventing the product receiving area formed by heat sealing a portion of the seal area of the laminate to the sealing flange of the tray.

An advantageous optional feature of the present invention is that it may include an integrally formed tamper-evident feature. In one preferred embodiment, the tamper-evident feature comprises visible whitened area of the sealing flange of the tray produced when the hermetic seal has been breached which occurs when the lidding film is peeled from the tray,

BRIEF DESCRIPTION OF THE DRAWINGS

Further features and advantages of the present invention will become apparent from the following detailed description, taken in combination with the appended drawings, in which.

DETAILED DESCRIPTION OF THE INVENTION

A preferred embodiment of the package 10 of the present invention includes a thermoplastic tray 11 and a multilayer thermoplastic lidding film laminate 12 as depicted in FIGS.

Figure 1:
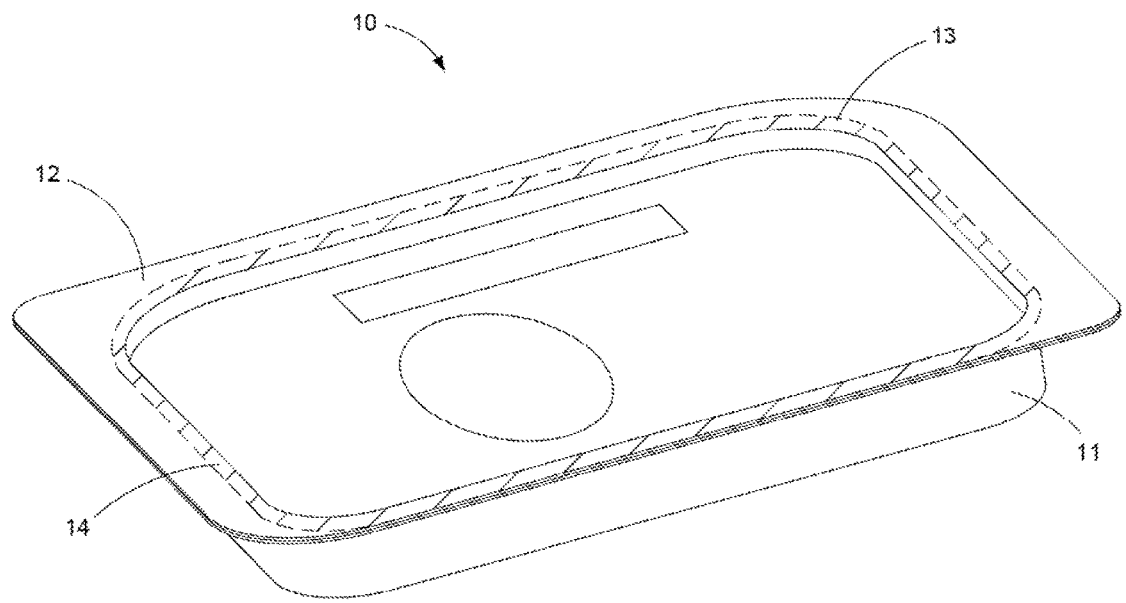
FIG. 1 illustrates a schematic view of one embodiment of a package according to the present invention.
Figure 2:
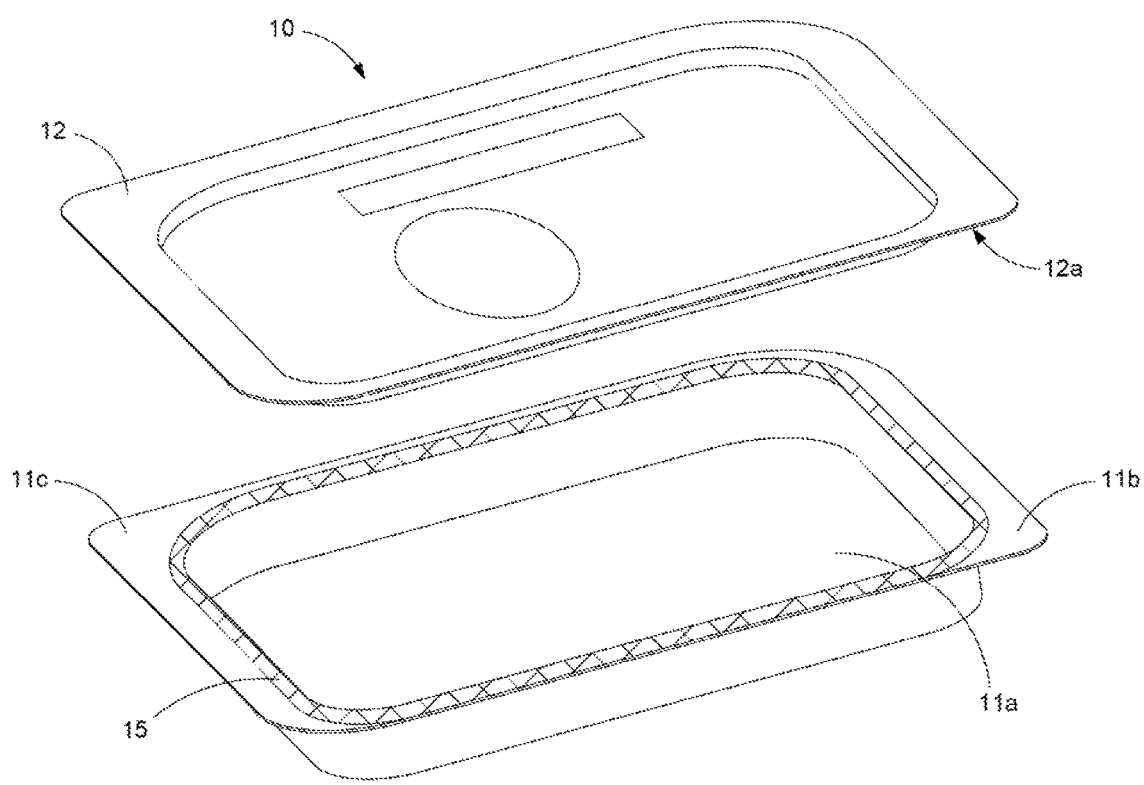
FIG. 2 illustrates an exploded schematic view one embodiment of package according to the present invention.

1 and 2. The thermoplastic tray 11 may be formed as a flexible, rigid and/or semi-rigid substrate formed from polyethylene terephthalate and may have any shape as required by the product being packaged. In one preferred embodiment, tray 11 is rigid or semi-rigid substrate comprising amorphous polyethylene terephthalate. In one preferred embodiment, tray 11 is thermoformed and has a product receiving area 11a and a sealing flange 11b. The depth of thermoforming, i.e., product receiving area may vary depending upon the amount and dimensions of the product(s) being packaged. It should be understood that the present invention also includes a non-thermoformed trays having a product receiving area and a sealing flange. Flexible trays may also include a thermoformed or non-thermoformed product receiving area 11a with a sealing flange as well. In another preferred embodiment, tray 11 consists essentially of a mono-layer amorphous polyethylene terephthalate (APET). As depicted in FIGS. 1 and 2, the product receiving area 11a is a thermoformed cavity displaced horizontally away from the sealing flange 11b. This displacement may be any distance including distances of between 1 mm and 100 mm, or between 1 mm and 50 mm, or between 1 mm and 10 mm, or between 5 mm and 7 mm. In this particular embodiment, the sealing flange 11b circumvents the product receiving area 11a and is shown having a width about 10 mm. The width of the sealing flange 11b may vary any distance and may include distances of between 2 mm and 20 mm, or 4 mm and 15 mm, or 6 mm and 10 mm. It should be understood that flange 11b may further optionally include an extended flap area 11c located at one corner of package 10 which facilitates the peeling open of said package. In at least one preferred embodiment, tray 11 includes good optical properties such as low haze, high gloss and/or no streaks or lines which detract from the tray's appearance. In another preferred embodiment, a substantial area of the tray 11 is optical transparent in order to render the product packaged therein visibly observable by the consumer when the package is displayed in a retail store. Tray 11 may be formed from a mono- or multilayer film construction. In this particular example illustrated in FIGS. 1 and 2, tray 11 comprises a mono-layer of amorphous polyethylene terephthalate and may have a thickness which varies between 50 μm and 800 μm, or 100 μm and 700 μm, or 200 μm and 500 μm.

As depicted in FIGS. 1-2, one preferred embodiment of the multilayer thermoplastic lidding film laminate 12 is illustrated having a substantially flat construction which is sealed to tray 11 at the tray's flange 11b to cover the product receiving area 11a. Laminate 12 may a flexible thermoplastic substrate, or as depicted in this particular example, a rigid or semi-rigid thermoplastic substrate. The overall thickness of laminate 12 may vary depending upon the thickness of the individual layers used to construct the laminate. Typically, the overall thickness of laminate 12 is between 25 μm and 500 μm, or between 50 μm and 300 μm, or between 100 μm and 250 μm. Lidding film laminate 12 has a sealing area 12a which is peelable sealed to the tray 11. This sealing area 12a encompasses a portion of the peripheral edge of the laminate and may vary in width. Laminate 12 may be slightly thermoformed such that the sealing area 12a is horizontally offset from the remaining portion of the laminate. In a preferred embodiment, lidding film laminate has a draw depth of between 1 mm and 10 mm, or between 3 mm and 8 mm, or between 5 mm and 7 mm.

In its final form, package 10 further includes a hermetic seal 13 comprising a perimeter heat seal 14 circumventing the product receiving area 11a formed by heat sealing a portion of the seal area 12a of the laminate 12 to the sealing flange 11b of the tray. Package 10 may optionally include an integrally formed tamper-evident feature 15. In one preferred embodiment, the tamper-evident feature 15 is visible whitened area of the sealing flange 11b of the tray which is produced when the hermetic seal 13 has been breached and occurs when the lidding film laminate 12 is peeled from the tray 11, as depicted in FIG. 2.

Figure 3:
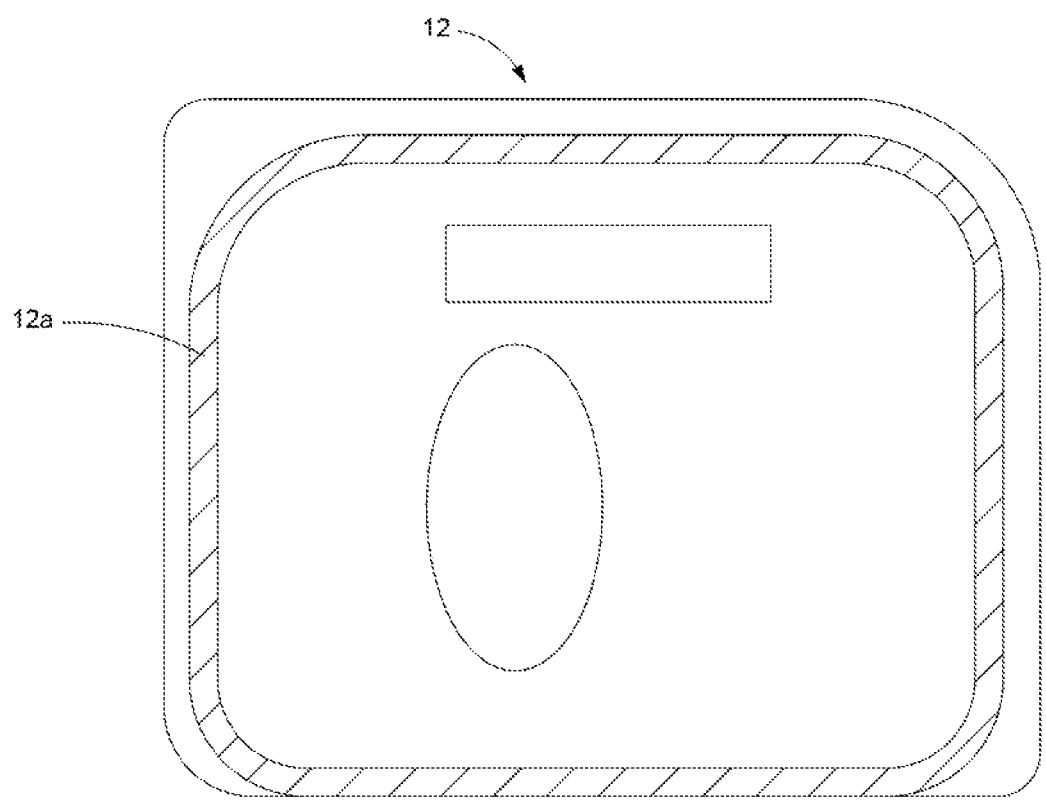
FIG. 3 illustrates a close-up schematic view of one embodiment of a lidding film laminate for use with the package according to the present invention.
Figure 4:
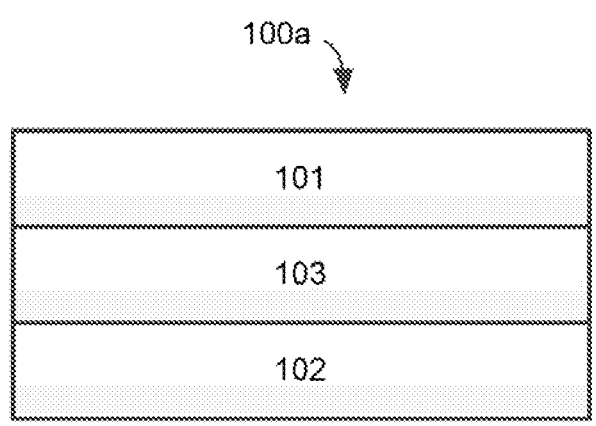
FIG. 4 illustrates a cross-sectional view of a preferred embodiment of a three-layer multilayer lidding film laminate of the present invention.

The construction of the lidding film laminate 12 is an important aspect of the present invention and includes a plurality of recyclable layers. In one preferred embodiment as depicted in FIG. 4, lidding film laminate 12 includes but is not limited to a three-layer film 100a having: a first outer layer 101 comprising a polyester copolymer heat sealing lacquer positioned within the seal area 12a, a second outer layer 102 comprising an amorphous polyethylene terephthalate, and a third layer 103 positioned between the first and second outer layers which comprises an oriented polyethylene terephthalate. In one preferred embodiment, the first outer layer 101 is a polyester copolymer solvent-based coating formulated for application onto a polyester-coated paperboard, uncoated polymers such as, but not limited to, amorphous polyethylene terephthalate, crystalline polyethylene terephthalate, polyvinyl chloride and/or aluminum substrates. First layer 101 may be applied to different substrates using well-known reverse gravure, direct gravure and/or flexo-printing technologies. After application to a substrate, first layer 101 provides a solvent-based heat-sealable coating which can form a peelable heat seal to various substrates under heat and/or pressure. Examples of such commercially available heat-sealable coatings are sold under the trademark family ADCOTE™ by The Dow Chemical Company, Midland, Mich., USA. In one preferred embodiment as shown in FIG. 3, first outer layer 101 is coated in-register onto third layer 103 such that only a marginal portion of the surface area of third layer 103 encompassing at least sealing area 12a is thereby covered. In this particular embodiment, first layer 101 is coated onto third layer 103 to form a semi-opaque hazy band 101a having a width equal to about 2.5 mm, or 5 mm, or 10 mm, or 20 mm extending from an outer edge to a pre-determined distance towards the center of lidding film laminate 12. Alternatively, first layer 101 may be coated onto third layer 103 such that it covers the entire surface area of third layer 103.

Layer 102 is a second outer layer positioned opposite first outer layer 101. In one preferred embodiment, second outer layer 102 is a free-standing film comprising amorphous polyethylene terephthalate. As a free-standing film, second outer layer 102 has a thickness which may vary between 50 μm and 500 μm, or between 80 μm and 350 μm, or between 150 μm and 250 μm.

Third layer 103 is positioned between first and second outer layers 101 and 102 and comprises oriented polyethylene terephthalate. This layer functions not only as a substrate for application of first layer 101, but also as a barrier to any residual solvent that may be present after application and drying of first layer 101. Because there may be residual solvent still present after the drying operation, a barrier is need to prevent migration of minutiae amounts of solvent which might cause off-flavors in food products packaged within the present invention. Towards this end, third layer 103 may have a thickness appreciably less than second out layer 102. Accordingly, third layer 103 has a thickness of between 5 μm and 200 μm, or between 5 μm and 150 μm, or between 10 μm and 100 μm. Examples of such commercially available oriented polyethylene terephthalate are those sold under the trademark family SKYROL® by SKC, Incorporated, Covington, Ga., USA.

Figure 5:
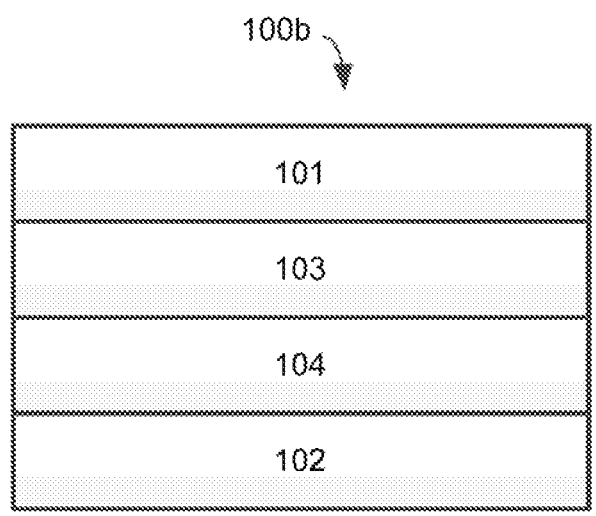
FIG. 5 illustrates a cross-sectional view of another preferred embodiment of a four-layer multilayer lidding film laminate of the present invention.

Optionally, as depicted in FIG. 5, lidding film laminate 12 may include a four-layer construction 100b having a fourth layer 104 positioned between the second outer layer 102 and the third layer 103 which comprises an adhesive. Any adhesive may be used to secure these two layers together. In one preferred embodiment, fourth layer 104 comprises a lamination adhesive which can be applied to either second outer layer 102 or third layer 103 by reverse gravure, direct gravure and/or with smooth roller printing systems. In one preferred embodiment, fourth layer 104 comprises a solvent-based, two-component polyurethane adhesive. Examples of such commercially available polyurethane adhesives are those sold under the trademark family ADOTE™ by The Dow Chemical Company, Midland, Mich., USA.

Figure 6:
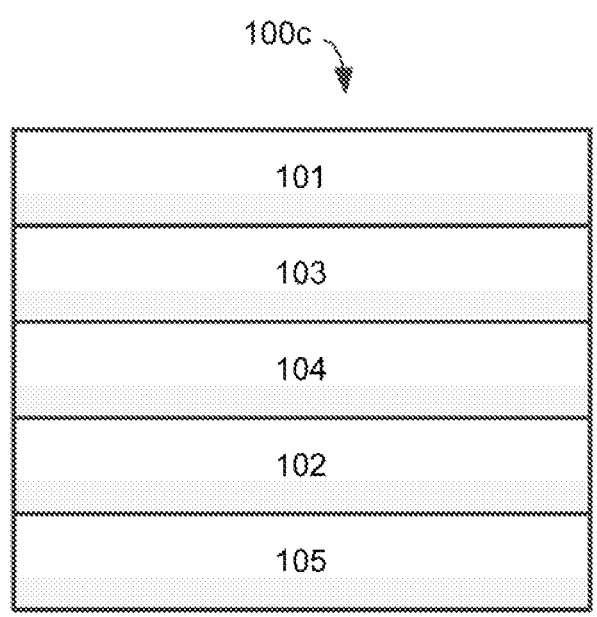
FIG. 6 illustrates a cross-sectional view of another preferred embodiment of a five-layer multilayer lidding film laminate of the present invention.

Optionally, as depicted in FIG. 6, lidding film laminate 12 may also include a five-layer construction 100c having a fifth layer 105 positioned on the surface of the second layer 102 comprising an ink. Fifth layer 105 may be applied to second layer 102 to cover its entire surface area or to less than the entire surface area of the layer 102. In one preferred embodiment, the ink of fifth layer 105 can be applied to second layer 102 by gravure and/or flexo-printing equipment and methods. In one preferred embodiment, fifth layer 105 comprises a water-soluble nitrocellulose-based ink. A water-soluble nitrocellulose-based ink is preferred because it can be easily removed by washing during the recycling process.

Figure 7:
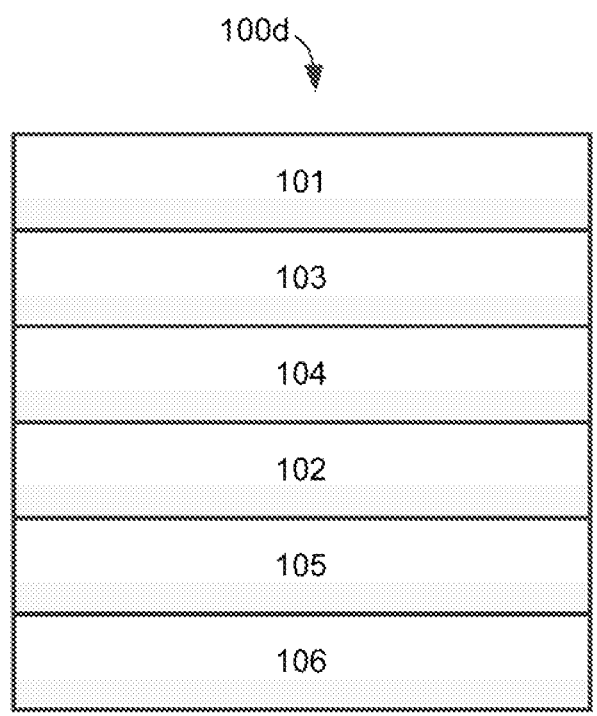
FIG. 7 illustrates a cross-sectional view of another preferred en embodiment of a six-layer multilayer lidding film laminate of the present invention.

Optionally, as depicted in FIG. 7, lidding film laminate 12 may still further include a six-layer construction 100d having a sixth layer 106 positioned on the surface of the fifth layer 105. This sixth includes an over-lacquer or overprint varnish which protects the ink of fifth layer 105. In ore preferred embodiment, sixth layer 106 is a nitrocellulose-based over-lacquer or overprint varnish which can be applied gravure and/or flexo-printing equipment and methods onto the outer surface of fifth layer 105 and/or and any unprinted surface of second layer 102. A water-soluble nitrocellulose-based over-lacquer or overprint varnish is preferred because it can be easily removed by washing during the recycling process.

WORKING EXAMPLE

In the production of Example 1 as illustrated in FIG. 7, laminate 100d was produced by unwinding a first free-standing film of amorphous polyethylene terephthalate, second outer layer 102, and surface printing a layer of water-soluble ink 105 followed by printing a layer of water-soluble over-lacquer 106 over the ink using printing techniques and method well-known in the art. A second free-standing film of biaxially oriented polyethylene terephthalate, third layer 103, was unwound and an adhesive layer 104 was coated onto one of its surfaces. The coated second free-standing film was then laminated to the print-free surface of the first free-standing film using lamination equipment and methods well known to those skilled in the art. A peelable heat-sealable lacquer was then pattern applied to the uncoated surface of the third layer 103.

Example 1

Example 1 is one embodiment of lidding film laminate 100d of the present invention having a structure and layer compositions as described below and as illustrated in FIG. 7. Reported below is the layer composition relative to the total weight of the layer.

Layer 101 (Sealant): 100 wt.-% of a polyester copolymer solvent-based having a thickness of approximately 3 µm-ADOTE™17-3 (The Dow Chemical Company, Midland, USA).

Layer 103: 100 wt.-% of an oriented polyethylene terephthalate polymer (OPET) having a thickness of approximately 12 µm-SKYROL® SL80C (SKC, Incorporated, Covington, Ga., USA).

Layer 104: 100 wt.-% of a two-component solvent-based polyurethane lamination adhesive having a thickness of approximately 3 µm-ADCOTE™ 301A/350A (The Dow Chemical Corporation, Midland, Mich. USA).

Layer 102: 100 wt.-% of an amorphous polyethylene terephthalate copolymer (APET) having a thickness of approximately 200 µm.

Layer 105: 100 wt.-% of a water-soluble nitrocellulose based printing ink-(Sun Chemical, Thourotte, FRANCE).

Layer 106: 100 wt.-% of a water-soluble nitrocellulose based over-lacquer-16500 VERNIS SURLAQUAGE (Sun Chemical, Thourotte, FRANCE).

The peel strength of an hermetic seal of Example 1 was measured by heat sealing the sealant layer of the inventive laminate 100d to an amorphous polyethylene terephthalate (APET) substrate at different temperatures under 530 N and a dwell time of 2 seconds. Specimens for testing after heat sealing were prepared by die cutting samples to a length of 100 mm and a width of 15 mm. The peel strength test was performed using a tensile testing apparatus with an un-sealed section of laminate 100d mounted in an upper jig and an un-sealed section of the APET substrate was folded back 180° and mounted in a lower jig. The test was implemented at a loading speed of 200 mm/min. The peel force values to delaminate the laminate 100d from the APET substrate were measured by moving the bottom jig vertically away from the top jig for a pre-determined distance. These force values were then averaged. This average value was taken as the average peel force. The average peel force (N, newton) per 15 mm and its standard deviation at different sealing temperatures were tabulated and are shown in TABLE 1 below.

TABLE 1

| | PEEL STRENGTH (N/15 MM) | | |
|---|---|---|---|
| Sealing Temperature | n | Average | Standard Dev. |
| 140° C. | 5 | 2.6 | 0.1 |
| 150° C. | 5 | 2.5 | 0.3 |
| 160° C. | 5 | 2.5 | 0.3 |
| 170° C. | 5 | 3.3 | 0.6 |
| 180° C. | 5 | 4.4 | 0 |
| 190° C. | 5 | 4.1 | 0.3 |
| 200° C. | 5 | 5.2 | 0.3 |
| 210° C. | 5 | 5.0 | 0.6 |
| 220° C. | 5 | 5.5 | 0.3 |

The above description and examples illustrate certain embodiments of the present invention and are not to be interpreted as limiting. Selection of particular embodiments, combinations thereof, modifications, and adaptations of the various embodiments, conditions and parameters normally encountered in the art will be apparent to those skilled in the art and a deemed to be within the spirit and scope of the present invention.

What is claimed:

1. A manually openable recyclable package for containing a product comprising:
   a tray having a product receiving area and a sealing flange, wherein the tray comprises an amorphous polyethylene terephthalate;
   a lidding film laminate having a seal area which is peelable sealed to the tray, wherein the laminate comprises:
      a first outer layer comprising a polyester copolymer heat sealing lacquer positioned within the seal area;
      a second outer layer comprising an amorphous polyethylene terephthalate; and
      a third layer positioned between the first and second outer layers which comprises an oriented polyethylene terephthalate; and
   a hermetic seal comprising a perimeter heat seal circumventing the product receiving area formed by heat sealing a portion of the seal area of the laminate to the sealing flange of the tray.

2. A package according to claim 1, wherein the package comprises a tamper-evident feature.

3. A package according to claim 2, wherein the tamper-evident feature comprises a visible whitened area of the sealing flange of the tray produced when the hermetic seal has been breached.

4. A package according to claim 1, wherein the tray is rigid or semi-rigid.

5. A package according to claim 1, wherein the tray is thermoformed.

6. A package according to claim 1, wherein the lidding film laminate is rigid or semi-rigid.

7. A package according to claim 1, wherein the lidding film laminate is thermoformed.

8. A package according to claim 7, wherein he lidding film laminate has a draw depth of between 5 mm and 10 mm.

9. A package according to claim 1, wherein the hermetic seal has a seal strength of between 1 N/15 mm and 6 N/15 mm at 23° C.

10. A package according to claim 1, wherein the second outer layer of the lidding film laminate has a thickness of between 80 μm and 350 μm.

11. A package according to claim 1, wherein the third layer of the lidding film laminate has a thickness of between 12 μm and 75 μm.

12. A package according to claim 1, wherein the lidding film laminate comprises a fourth layer positioned between the second outer layer and the third layer, wherein the fourth layer comprises an adhesive.

13. A package according to claim 12, wherein the adhesive is a solvent-based, two-component polyurethane adhesive.

14. A package according to claim 12, wherein the lidding film laminate comprises a fifth layer positioned on the surface of the second layer, wherein the fifth layer compromises a water-soluble ink.

15. A package according to claim 14, wherein the lidding film laminate comprises a sixth layer positioned on the surface of the fifth layer, wherein the sixth layer compromise a water-soluble overlacquer.

16. A package according to claim 1, wherein the first outer layer of the laminate is pattern-applied onto the third layer of the laminate.

17. A package according to claim 1, wherein the package comprises at least 97% by weight polyethylene terephthalate relative to the total weight of the package.

18. A package according to claim 1, wherein the tray comprises between 1% and 20% by weight of recycled polyethylene terephthalate relative to the total weight of the tray.

19. A package according to claim 1, wherein the package is a horizontal form-fill-seal package.

20. A package according to claim 1, wherein the package has an average oxygen transmission rate of 12 $cm^3/m^2$ for 24 hours at 23° and 50% relative humidity and an average carbon dioxide transmission rate of 54 $cm^3/m^2$ for 24 hours at 23° and 50% relative humidity.

* * * * *

UNITED STATES PATENT AND TRADEMARK OFFICE
CERTIFICATE OF CORRECTION

| | |
|---|---|
| PATENT NO. | : 10,399,759 B2 |
| APPLICATION NO. | : 15/553464 |
| DATED | : September 3, 2019 |
| INVENTOR(S) | : Séverine Vinet et al. |

It is certified that error appears in the above-identified patent and that said Letters Patent is hereby corrected as shown below:

On the Title Page

Page 2, Column 2, Item (56) References Cited, U.S. Patent Documents: delete "2013/0224946" and insert -- 2013/0224446 --;

In the Specification

Column 2, Line 34: delete "tray," and insert -- tray. --;
Column 2, Line 44: after "view" insert -- of --;
Column 2, Line 45: after "embodiment of" insert -- a --;
Column 2, Line 59: after "preferred" delete "en";
Column 6, Line 66: after "art and" delete "a" and insert -- are --;

In the Claims

Claim 8, Column 7, Line 35: after "wherein" delete "he" and insert -- the --;
Claim 14, Column 8, Line 16-17: delete "compromises" and insert -- comprises --;
Claim 15, Column 8, Line 20: delete "compromise" and insert -- comprise --.

Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*